Feb. 1, 1955 J. N. J. LEEMAN 2,701,058
APPARATUS FOR SEPARATING SOLID PARTICLES
Filed July 1, 1953 2 Sheets-Sheet 2

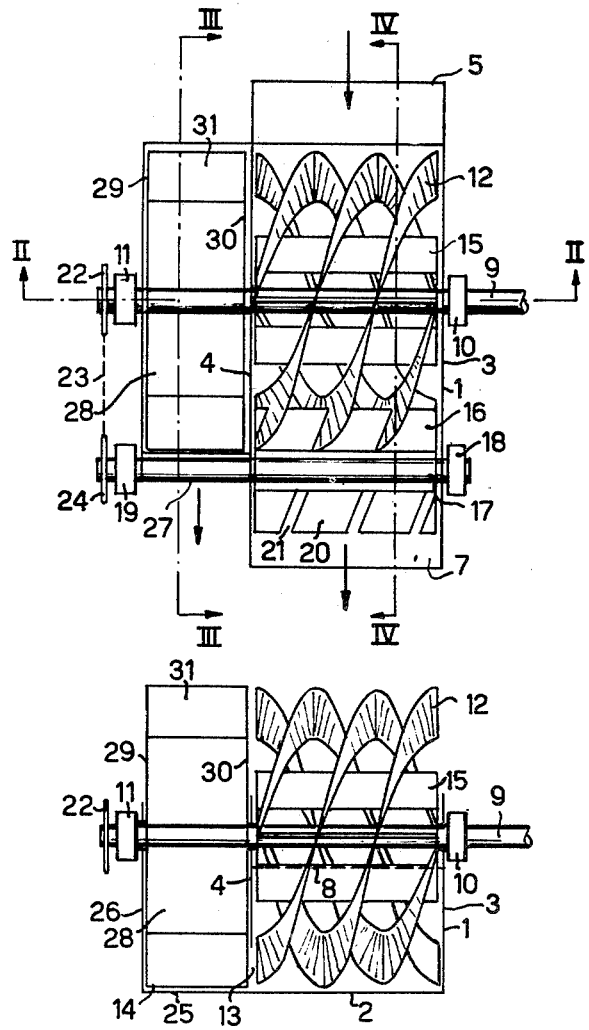

Inventor
Jan N. J. Leeman
By Cushman, Darby & Cushman
Attorneys

United States Patent Office 2,701,058
Patented Feb. 1, 1955

2,701,058

APPARATUS FOR SEPARATING SOLID PARTICLES

Jan N. J. Leeman, Brunssum, Netherlands, assignor to Stamicarbon N. V., Heerlen, Netherlands Application July 1, 1953, Serial No. 365,477

Claims priority, application Netherlands July 7, 1952

2 Claims. (Cl. 209—172.5)

This invention relates to an apparatus for separating mixtures of particles by a float-and-sink method.

It is an object of the invention to provide a novel, simple and efficient apparatus for the separation of mixtures of solids.

Another object of the invention is to provide an apparatus for the separation of mixtures of solids which requires less space than known apparatus of corresponding capacity.

Still another object of the invention is to provide an apparatus for the separation of mixtures of solids in which both the float and sink fractions are discharged in the same direction out of the separator.

A further object of the invention is to provide an apparatus for the separation of mixtures of solids in which the means for conveying and discharging the separated fractions in the separator are of simple design and may be operated by a single source of power.

The foregoing and other objects of the invention will be apparent from the following specification and accompanying drawings, in which drawings:

Figure 1 is a plan view of a separator according to the invention;

Figure 2 is a longitudinal section on the line II—II of Figure 1;

Figure 3:
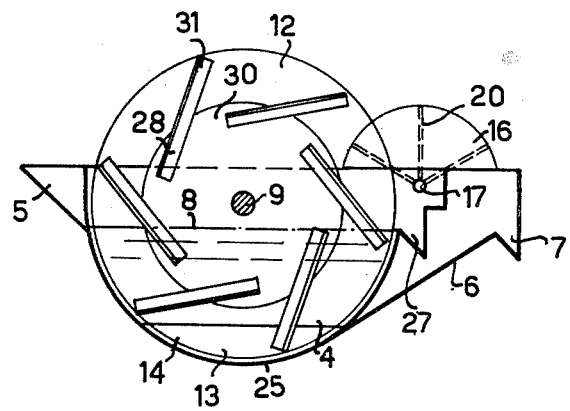
Figure 3 is a vertical section on the line III—III of Figure 1.
Figure 4:
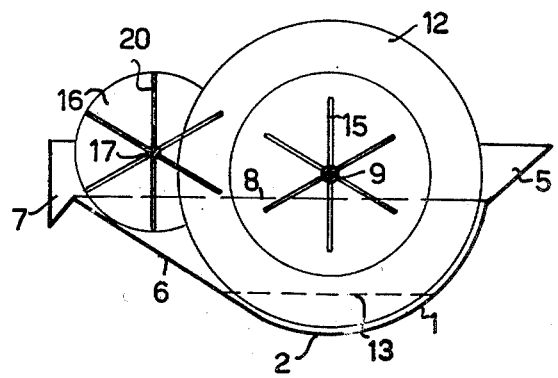
Figure 4 is a vertical section on the line IV—IV of Figure 1.

Referring to the drawings, the numeral 1 designates a compartment or tank in which the float-and-sink separation takes place. Compartment 1 is of generally semi-circular shape to include a curved bottom and side 2 and vertical end walls 3 and 4. The semi-circular bottom 2 is provided at one edge with an inclined chute or launder 5 which receives the material to be separated, for instance, raw coal, supplied in any suitable manner.

At the side opposite to the feed chute 5 the wall 2 includes an inclined wall portion 6 terminating in an overflow or weir 7 for discharge of the floating particles. In operation the compartment 1 is filled with a bath having a specific gravity between that of the light and heavy components of the mixture to be separated. For example, the bath may comprise a suspension of magnetite in water up to the level 8, which is established by the overflow 7.

A shaft 9 is provided coaxially of the semicircular compartment 1. Shaft 9 is journalled in bearings 10 and 11 supported on the end walls and is driven by a suitable source of power, not shown in the drawings. Spiral blades 12 are mounted on the shaft 9 so that, in operation of the separator, particles which have settled on the bottom 2 are conveyed towards the end wall 4. Near its bottom edge, the end wall 4 is provided with an opening 13 through which the compartment 1 communicates with a secondary compartment 14, which receives the heavy particles discharged by conveyor 12 from compartment 1.

The spiral blades 12 are mounted in spaced relation to their axis shaft 9 and a number of paddle blades 15 are provided inwardly of the spiral blades 12 and substantially radial with respect to the shaft 9. As the spiral conveyor 12 rotates to feed settled particles into the compartment 14, the paddles 15 rotate to promote the travel of the float particles across the separation compartment towards the overflow 7.

In the pocket defined by the inclined wall 6 of the compartment 1 a paddle wheel 16 is provided mounted on a shaft 17 which is parallel to the shaft 9 and journalled in bearings 18 and 19. As best shown in Figure 1, the blades 20 of paddle wheel 16 are provided with inclined slots 21 into which the spiral blades 12 project to mesh with wheel 16. This gives a very compact construction. The shaft 17 is driven synchronously with the shaft 9 through a sprocket wheel 22 fixed on shaft 9, a sprocket chain 23, and a sprocket wheel 24 fixed on the shaft 17.

The compartment 14 comprises a semi-cylindrical wall 25 of the same radius as the bottom wall 2 of compartment 1, a vertical end wall 26 and the partition wall 4 which separates the compartments 1 and 14 except at the opening 13. It will be observed that the compartments 14 and 1 are arranged end-to-end, or in tandem relation.

The wall 25 is provided with an overflow lip 27 disposed at the same height as the overflow 7 and on the same side of the separator. Rotatable in compartment 14 is a paddle wheel 28 mounted on the shaft 9; paddle wheel 9 being composed of two circular end plates or discs 29 and 30 spaced by non-radial paddles or scoops 31 positioned to have their outer edges trail their inner edges as shown in Figure 3. The heavy particles which are pushed into compartment 14 by conveyor 12 are scooped up by the wheel 28 and discharged via the overflow 27.

As will be seen from the arrows in Figure 1, the separated fractions are discharged in the same general direction as that in which the material to be separated is supplied to the separator. Consequently, the separator easily can be kept under observation. Also, a single screen may be used for dewatering the light and heavy products discharged at 7 and 27, the two fractions being kept separated on the screen by a partition on the screen deck.

The entire apparatus takes up little space, and a common drive may be used for both the spiral conveyor 12 and the paddle wheels 16 and 28. Because the diameter of the spiral conveyor 12 is such that the shaft 9 for driving the moving parts lies above the liquid level 8, wear is kept to a minimum.

The terminology used in the specification is for the purpose of description and not of limitation, the scope of the invention being defined in the claims.

I claim:

1. In an apparatus for separating mixtures of particles, a tank including first and second compartments positioned end-to-end and in communication with each other through an opening at their bottom portions, the first compartment being adapted to receive at one side thereof material to be separated, means to discharge float particles from the opposite side of the first compartment, a spiral conveyor in the first compartment for moving particles settled in that compartment transversely of the direction of travel of the float particles and through the opening into the second compartment, said spiral conveyor comprising a shaft, strips extending spiraling around and in spaced relation to said shaft, and radial paddle blades positioned between the inner edges of said strips and said shaft to move floating particles to the floating particle discharge, and means in the second compartment for raising and discharging therefrom the settled particles supplied thereto by said spiral conveyor.

2. In an apparatus for separating mixtures of particles, a tank including first and second compartments positioned end-to-end and in communication with each other through an opening at their bottom portions, the first compartment being adapted to receive at one side thereof material to be separated, a spiral conveyor in the first compartment for moving particles settled in that compartment transversely of the direction of travel of the float particles and through the opening into the second compartment, means to discharge float particles from the opposite side of the first compartment, said float particle discharge means comprising a shaft parallel to the axis of said spiral conveyor, blades extending radially from said shaft, said blades being slotted to mesh with the helices of said spiral conveyor, and means to drive said shaft and spiral conveyor in synchronism, and means in the second compartment for raising and discharging therefrom the settled particles supplied thereto by said spiral conveyor.

(References on following page)

References Cited in the file of this patent

UNITED STATES PATENTS

| Number | Name | Date |
|---|---|---|
| 466,753 | Hockley | Jan. 5, 1892 |
| 1,312,098 | Cerruti | Aug. 5, 1919 |
| 1,404,873 | McGee | Jan. 31, 1922 |
| 2,521,152 | Davis | Sept. 5, 1950 |

FOREIGN PATENTS

| Number | Country | Date |
|---|---|---|
| 159,229 | Germany | Mar. 17, 1905 |
| 812,241 | Germany | Aug. 27, 1951 |